(12) United States Patent
Chadha

(10) Patent No.: US 11,074,763 B2
(45) Date of Patent: Jul. 27, 2021

(54) SYSTEMS AND METHODS FOR EDITING SHAPES OF FACETED GEOMETRIES

(71) Applicant: ANSYS, INC., Canonsburg, PA (US)

(72) Inventor: Sourabh Chadha, Pune (IN)

(73) Assignee: ANSYS, INC., Canonsburg, PA (US)

(*) Notice: Subject to any disclaimer, the term of this patent is extended or adjusted under 35 U.S.C. 154(b) by 0 days.

(21) Appl. No.: 16/773,185

(22) Filed: Jan. 27, 2020

(65) Prior Publication Data
US 2021/0183159 A1  Jun. 17, 2021

(30) Foreign Application Priority Data
Dec. 11, 2019 (IN) .............................. 201941051356

(51) Int. Cl.
*G06T 19/20* (2011.01)
*G06T 17/20* (2006.01)

(52) U.S. Cl.
CPC .............. *G06T 19/20* (2013.01); *G06T 17/20* (2013.01); *G06T 2219/2021* (2013.01)

(58) Field of Classification Search
CPC ......... G06T 17/00; G06T 17/10; G06T 17/20; G06T 19/00; G06T 19/20; G06T 2019/2021; G06T 2219/2021
See application file for complete search history.

(56) References Cited

U.S. PATENT DOCUMENTS

| | | | | |
|---|---|---|---|---|
| 6,483,506 B1* | 11/2002 | Costabel | ................. | G06T 13/20 345/419 |
| 2004/0056871 A1* | 3/2004 | Milliron | .................. | G06T 13/00 345/647 |
| 2014/0149944 A1* | 5/2014 | Duplessis | ........... | G06F 3/04815 715/849 |
| 2017/0358144 A1* | 12/2017 | Schwarz | ............. | G06F 3/04842 |

* cited by examiner

*Primary Examiner* — Diane M Wills
(74) *Attorney, Agent, or Firm* — Womble Bond Dickinson (US) LLP

(57) ABSTRACT

Machine assisted system and method for changing the shape of a faceted surface using points that move in their local coordinate system collectively are described. The method can include receiving a model having a predefined faceted geometry, the model representing a physical structure that is designed or simulated in a data processing system; generating points surrounding the predefined faceted geometry to be morphed; automatically assigning each of the generated points a respective local coordinate system; selecting a control point among the generated points for controlling a movement of the generated points; and displacing the selected control point in a local coordinate system assigned to the selected control point to cause each point to move based on movement of the selected control point according to the assigned local coordinate system, wherein the displacement of the selected control point guides a morphing of the predefined faceted geometry in the model.

26 Claims, 16 Drawing Sheets

SYSTEMS AND METHODS FOR EDITING SHAPES OF FACETED GEOMETRIES

This application claims the benefit of Indian Application No. 201941051356 filed on Dec. 11, 2019.

BACKGROUND

The shape of a faceted geometry can be modified using various morphing techniques. Users can use edges or surfaces as targets to morph the shape of the faceted geometry. In addition, users can move edges or surfaces as guidance for morphing the faceted geometry. However, the most common technique to morph the shape of the faceted geometry is to use points. Points or known as reference points can be moved and the movement of the reference points guides the deformation of the faceted geometry. The faceted geometry can be morphed by providing a point cloud and providing a displacement on each point. The displacement of the points guides the morphing of the faceted geometry. The points are free to move in any direction, but for a large number of points it may not be practical for the user to specify displacement and direction of each point because it can be tedious and time consuming.

Existing morphing tools allow users to move points independent of one another or move them along a surface or edge or apply scaling transform. There are situations where such tools have limited applicability and usability. For example, a user has to precisely manually move all of the points in the correct direction to change the shape of a cylinder. This can be time consuming and tedious.

Thus, Applicants have recognized that there is a need for a system, software, and related methods to improve the shortcomings of existing morphing tools discussed above.

SUMMARY OF THE DESCRIPTION

Machine assisted systems and methods for morphing a faceted geometry. A computer-implemented method according to one embodiment described herein. The method can include the following operations: receiving a model having a predefined faceted geometry, the model can represent a physical structure that can be designed or simulated in a data processing system; generating a plurality of points surrounding the predefined faceted geometry to be morphed; automatically assigning each of the generated plurality of points a respective local coordinate system; selecting a control point among the generated plurality of points for controlling a movement of the generated plurality of points; and displacing the selected control point in the respective local coordinate system of the selected control point to cause each point to move based on movement of the selected control point according to the assigned local coordinate system, wherein the displacement of the selected control point guides a morphing of the predefined faceted geometry in the model.

In one embodiment, the method can further include receiving a user input, wherein the user input can include a number of control points to be generated and wherein the generated plurality of points can include points on different surfaces or different edges.

In one embodiment, the method can further include adjusting the control point by projecting the control point on the predefined faceted geometry of the model and the associated coordinate system.

In one embodiment, the method can further include sampling the generated plurality of points by using an automated algorithm or manually picking a plurality of locations on a surface of the predefined faceted geometry.

In one embodiment, the method can further include positioning the generated plurality of points away from the predefined faceted geometry in the model by positioning oriented bounding regions around the predefined faceted geometry, a centroid of each of the oriented bounding regions defining a corresponding one of the generated oriented bounding regions, and wherein an orientation of each of the oriented bounding regions defines a direction in which a respective point moves in the generated plurality of points.

In one embodiment, the method can further include adjusting the assigned coordinate system at each of the generated plurality of points by projecting the assigned coordinate system on the predefined faceted geometry and using a normal vector at a point of projection.

In one embodiment, the generated plurality of points can be linked to one another and wherein the morphed predefined geometry can be used to generate a mesh that is used in the simulation.

In one embodiment, the selected control point can be configured to be moveable in any direction and the selected control point can be changed during a series of displacements.

In one embodiment, the method can further include, assigning a scale factor to each of the generated plurality of points prior to displacing the selected control point in the respective local coordinate system.

Another embodiment relates to a computer-implemented system for morphing a faceted geometry. The system can include a user interface coupled to an input/output device; a memory storing instruction; and one or more processors coupled to the user interface and the memory, the one or more processors executing the instructions from the memory, the one or more processors configured to perform a method. The method can include: receiving a model having a predefined faceted geometry, the model can represent a physical structure that can be designed or simulated in a data processing system; generating a plurality of points surrounding the predefined faceted geometry to be morphed; automatically assigning each of the generated plurality of points a respective local coordinate system; selecting a control point among the generated plurality of points for controlling a movement of the generated plurality of points; and displacing the selected control point in the respective local coordinate system of the selected control point to cause each point to move based on movement of the selected control point according to the assigned local coordinate system, wherein the displacement of the selected control point guides a morphing of the predefined faceted geometry in the model.

In one embodiment, the method can further include receiving a user input, wherein the user input includes a number of control points to be generated and wherein the generated plurality of points can include points on different surfaces or different edges.

In one embodiment, the method can further include adjusting the control point by projecting the control point on the predefined faceted geometry of the model and the associated coordinate system.

In one embodiment, the method can further include sampling the generated plurality of points by using an automated algorithm or manually picking a plurality of locations on a surface of the predefined faceted geometry.

In one embodiment, the method can further include positioning the generated plurality of points away from the predefined faceted geometry in the model by positioning oriented bounding regions around the predefined faceted geometry, a centroid of each of the oriented bounding regions defining a corresponding one of the generated oriented bounding regions, and wherein an orientation of each of the oriented bounding regions defines a direction in which a respective point moves in the generated plurality of points.

In one embodiment, the method can further include adjusting the assigned coordinate system at each of the generated plurality of points by projecting the assigned coordinate system on the predefined faceted geometry and using a normal vector at a point of projection.

In one embodiment, the generated plurality of points can be linked to one another and wherein the morphed predefined geometry can be used to generate a mesh that is used in the simulation.

In one embodiment, the selected control point can be configured to be moveable in any direction and the selected control point can be changed during a series of displacements.

In one embodiment, the method can further include assigning a scale factor to each of the generated plurality of points prior to displacing the selected control point in the respective local coordinate system.

Another embodiment relates to a non-transitory machine readable medium storing executable program instructions which when executed by a data processing system causes the data processing system to perform a method. The method can include: receiving a model having a predefined faceted geometry, the model can represent a physical structure that can be designed or simulated in a data processing system; generating a plurality of points surrounding the predefined faceted geometry to be morphed; automatically assigning each of the generated plurality of points a respective local coordinate system; selecting a control point among the generated plurality of points for controlling a movement of the generated plurality of points; and displacing the selected control point in the respective local coordinate system of the selected control point to cause each point to move based on movement of the selected control point according to the assigned local coordinate system, wherein the displacement of the selected control point guides a morphing of the predefined faceted geometry in the model.

In one embodiment, the method can further include receiving a user input, wherein the user input includes a number of control points to be generated and wherein the generated plurality of points can include points on different surfaces or different edges.

In one embodiment, the method can further include adjusting the control point by projecting the control point on the predefined faceted geometry of the model and the associated coordinate system.

In one embodiment, the method can further include sampling the generated plurality of points by using an automated algorithm or manually picking a plurality of locations on a surface of the predefined faceted geometry.

In one embodiment, the method can further include positioning the generated plurality of points away from the predefined faceted geometry in the model by positioning oriented bounding regions around the predefined faceted geometry, a centroid of each of the oriented bounding regions defining a corresponding one of the generated oriented bounding regions, and wherein an orientation of each of the oriented bounding regions defines a direction in which a respective point moves in the generated plurality of points.

In one embodiment, the method can further include adjusting the assigned coordinate system at each of the generated plurality of points by projecting the assigned coordinate system on the predefined faceted geometry and using a normal vector at a point of projection.

In one embodiment, the generated plurality of points can be linked to one another and wherein the morphed predefined geometry can be used to generate a mesh that is used in the simulation.

In one embodiment, the selected control point can be configured to be moveable in any direction and the selected control point can be changed during a series of displacements.

In one embodiment, the method can further include assigning a scale factor to each of the generated plurality of points prior to displacing the selected control point in the respective local coordinate system.

The aspects and embodiments described herein can include non-transitory machine readable media that store executable computer program instructions that when executed can cause one or more data processing systems to perform the methods described herein when the computer program instructions are executed by the one or more data processing systems. The instructions can be stored in non-volatile memory such as flash memory or dynamic random access memory which is volatile or other forms of memory.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limited in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

The embodiments described herein can allow a faceted geometry to be morphed to a new shape via a transformation or a projection to the faceted geometry while keeping the same mesh. The geometric design change can be changed directly to the mesh in the solver. For example, the embodiments described herein can allow a user to move only one point to change a radius of a cylinder. Hence, this approach can be a much faster approach for morphing a faceted geometry in an optimization study that constantly requires a change in the geometry. The morphed geometry can be used with other tools such as FLUENT meshing, WB meshing, SpaceClaim meshing, and TurboGrid.

Figure 1:
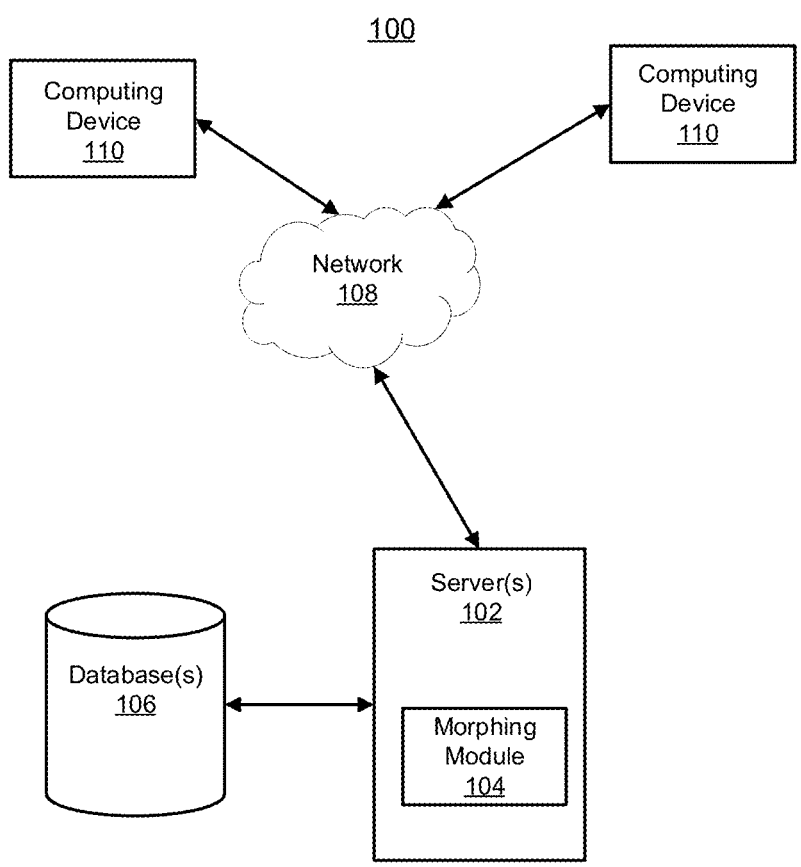
FIG. 1 shows an example of a computer-implemented environment in which users can interact with a model operation system hosted on a server through a network according to an embodiment.

FIG. 1 illustrates an example of a computer-implemented environment 100 in which one or more computing devices 110 can be used to interact with a morphing module 104 hosted on one or more servers 102 through a communication network 108. The one or more servers 102 can interact with one or more databases 106 that can store data such as an engineering model. The morphing module 104 can assist one or more users operating the one or more computing devices 110 to retrieve the engineering model having faceted geometry. Specifically, the morphing module 104 can be used to modify the shape of the faceted geometry. The morphing module 104 can be used to produce effects like changing the radius of a cylindrical surface, generalized shrinking or expansion of arbitrary shaped holes, and changing the radius of fillets. The morphing module 104 can add power and flexibility to the morphing of an object by linking the movement of all reference points to a single master control point. The morphing module 104 can also change the shape of the faceted surface using points that move in (or with movement represented in) their local coordinate system collectively. If the coordinate system for all the points are aligned in the same direction, the resultant morphing can be similar to the effect of morphing by moving entire surfaces or edges.

Figure 2A:
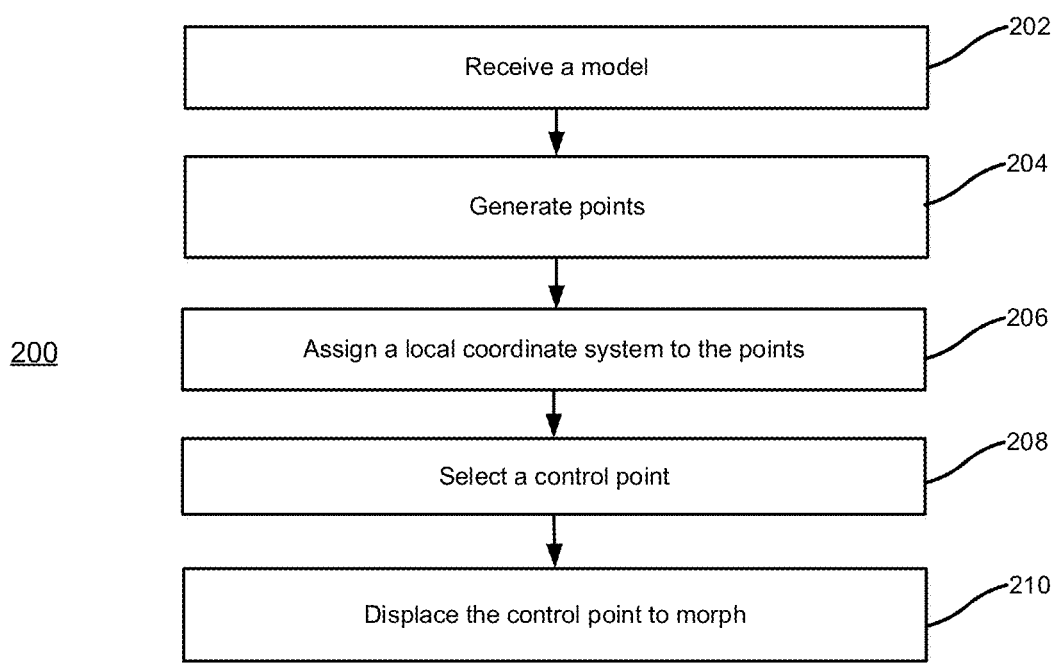
FIG. 2A is a flowchart which illustrates an overview method according to one embodiment.

FIG. 2A represents an overview of a computer-implemented method 200 according to one embodiment. In operation 202, a data processing system, such as the data processing system shown in FIG. 8, can receive a model having a predefined faceted geometry. The model can represent a physical structure that can be designed or simulated in a data processing system. The predefined faceted geometry may include a geometry that can be represented by discrete triangles, quads, or general polygons. The model can be generated using a geometry modeler as readily known to the person of ordinary skilled in the art. The predefined faceted geometry can be generated using a meshing generator such as FLUENT meshing, or other meshing generator as readily known to the person of ordinary skilled in the art.

The data processing system can include a module, such as the morphing module 104 shown in FIG. 1. Referring back to FIG. 2A, in operation 204, a plurality of points surrounding the predefined faceted geometry to be morphed can be generated. In operation 206, each of the generated plurality of points can be assigned with a respective local coordinate system. In operation 208, a control point among the generated plurality of points for controlling a movement of the generated plurality of points can be selected. In operation 210, the selected control point in the respective local coordinate system of the selected control point can be displaced to cause each point to move based on movement of the selected control point according to the assigned local coordinate system, wherein the displacement of the selected control point guides a morphing of the predefined faceted geometry in the model. As the control point moves, the movement of the control point in the local coordinate system can be applied to all other points in their respective local coordinate systems.

In other scenarios, the computer implemented method can be used to adjust the radius of a cylindrical surface, shrink or expand of arbitrary shaped holes, or change the radius of fillets.

Figure 2B:
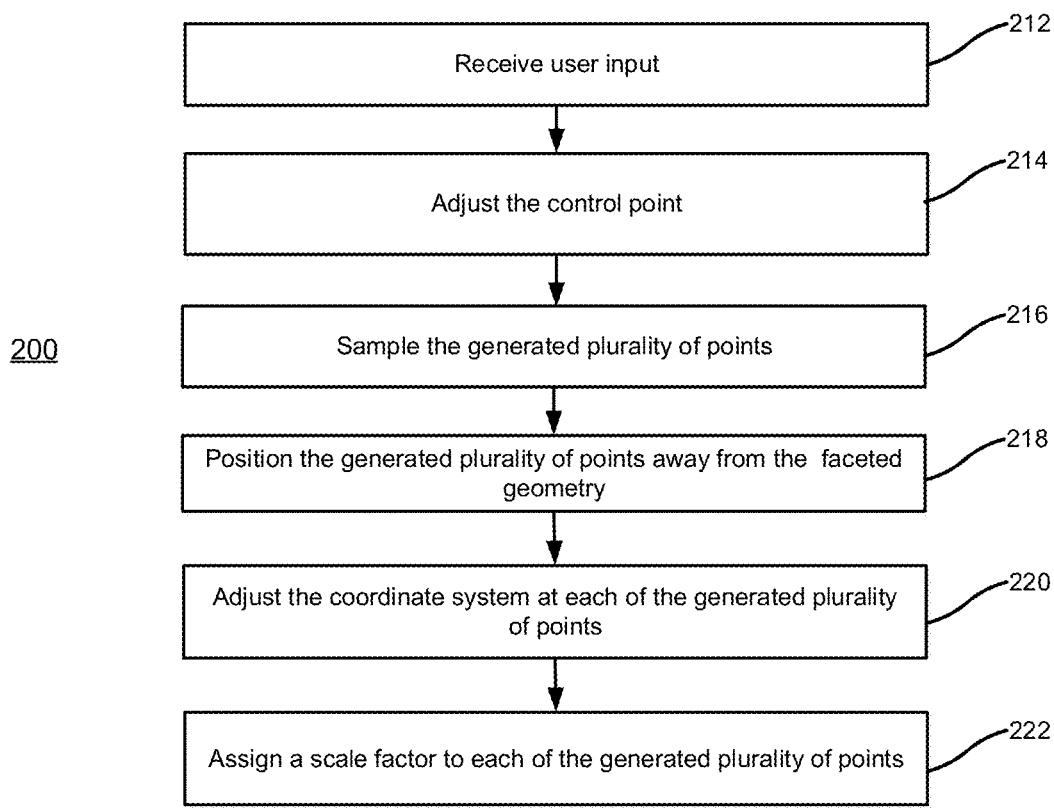
FIG. 2B is a flowchart which illustrates an overview method according to one embodiment.

Referring to FIG. 2B, in one embodiment, the computer implemented method 200 can further include an operation 212 to receive a user input. The user input can include a number of control points to be generated wherein the generated plurality of points can include points on different surfaces or different edges. In one embodiment, data processing system, such as the data processing system shown in FIG. 8, can include a morphing module having an embodiment of method 200 that can include an operation 214 adjusting the control point by projecting the control point on the predefined faceted geometry in the model and the associated coordinate system.

Still referring to FIG. 2B, the embodiment of method 200, can further include an operation 216 sampling the generated plurality of points by using an automated algorithm or manually picking a plurality of locations on a surface of the predefined faceted geometry. For example, a user can manually sample points by clicking on the surface at various locations or by using an automated algorithm to select the points to be included in the morphing. The selection of points can change the number of points to be included in the morphing. In one embodiment, the number of the generated plurality of points can be controlled by refining or coarsening the oriented bounding boxes. In one embodiment, the automated algorithm can include coarsening or spatial partitioning. In one embodiment, the coordinate system on the sampled points can also be computed automatically using the normal vector at the locations. In one embodiment, the embodiment of method 200, can further include an operation 218 positioning the generated plurality of points away from the predefined faceted geometry in the model by positioning oriented bounding regions around the predefined faceted geometry, a centroid of each of the oriented bounding regions defining a corresponding one of the generated oriented bounding regions, and wherein an orientation of each of the oriented bounding regions defines a direction in which a respective point moves in the generated plurality of points.

In one embodiment, the master control point can be changed during the deformation.

As shown in FIG. 2B, the embodiment of method 200, can further include an operation 220 adjusting the assigned coordinate system at each of the generated plurality of points by projecting the assigned coordinate system on the predefined faceted geometry and using a normal vector at a point of projection.

In one embodiment, the generated plurality of points can be linked to one another and wherein the morphed predefined geometry can be used to generate a mesh that is used in the simulation. In one embodiment, the selected control point can be configured to be moveable in any direction and the selected control point can be changed during a series of displacements.

Figure 6A:
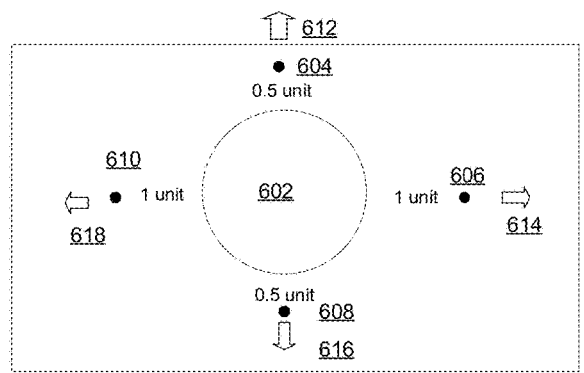
FIG. 6A shows an example of an asymmetric deformation applied to the reference points according to an embodiment.
Figure 6B:
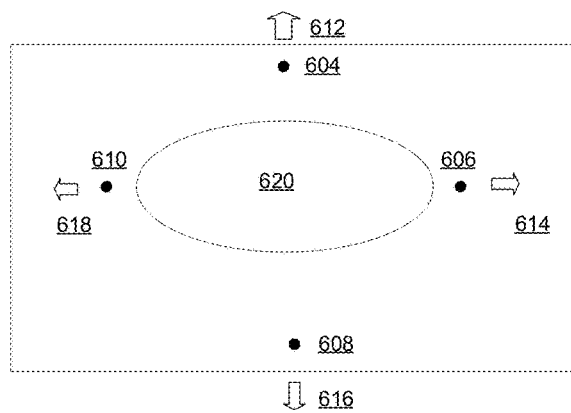
FIG. 6B shows an example of a morphed shape based on asymmetric deformation according to an embodiment.

Referring to FIG. 2B, the embodiment of method 200, can further include an operation 222 assigning a scale factor to each of the generated plurality of points prior to displacing the selected control point in the respective local coordinate system. As illustrated in FIG. 6A, various scale factors can be assigned to each of the generated plurality of points 604, 606, 608, 610. In this example, a scale factor of 0.5 can be assigned to points 604 and 608. A scale factor of 1.0 can be assigned to points 606 and 610. The assigned factor to each reference point can be used to specify the movement of the point relative to the control point. As shown in FIG. 6B, the assigned factor can allow one side of the geometry to be deformed more than the other side.

Figure 3A:
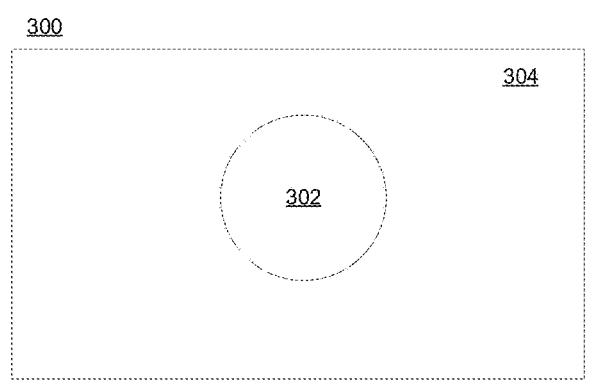
FIG. 3A shows an example of a faceted geometry before morphing, according to an embodiment.

The computer-implemented method 200 can be used in various morphing scenarios. For example, the data processing system can receive a model having a predefined faceted geometry 300 as illustrated in FIG. 3A. Specifically, FIG. 3A shows a model having a circular shape 302 inside a rectangular shape 304. The computer-implemented method 200 can be used for changing the radius of the circular shape 302 inside the rectangular shape 304.

Figure 3B:
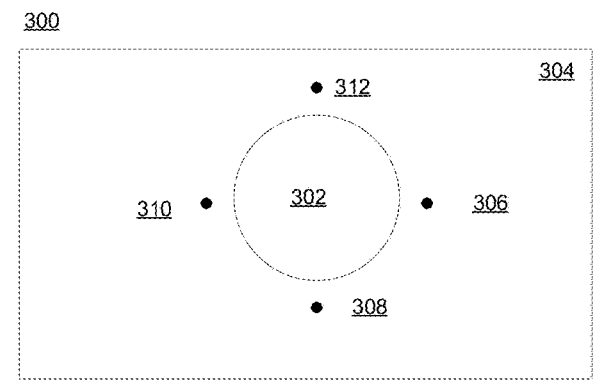
FIG. 3B shows an example of generated reference points around the faceted geometry that needs to be morphed according to an embodiment.

FIG. 3B shows how the data processing system can generate reference points 306, 308, 310, 312 around the circular shape 302 inside the rectangular shape 304 of a predefined faceted geometry 300 that needs to be morphed. In various embodiments, the plurality of points can be generated using a bounding box method or any other methods, as will be readily understood by one having ordinary skill in the art.

Figure 7A:
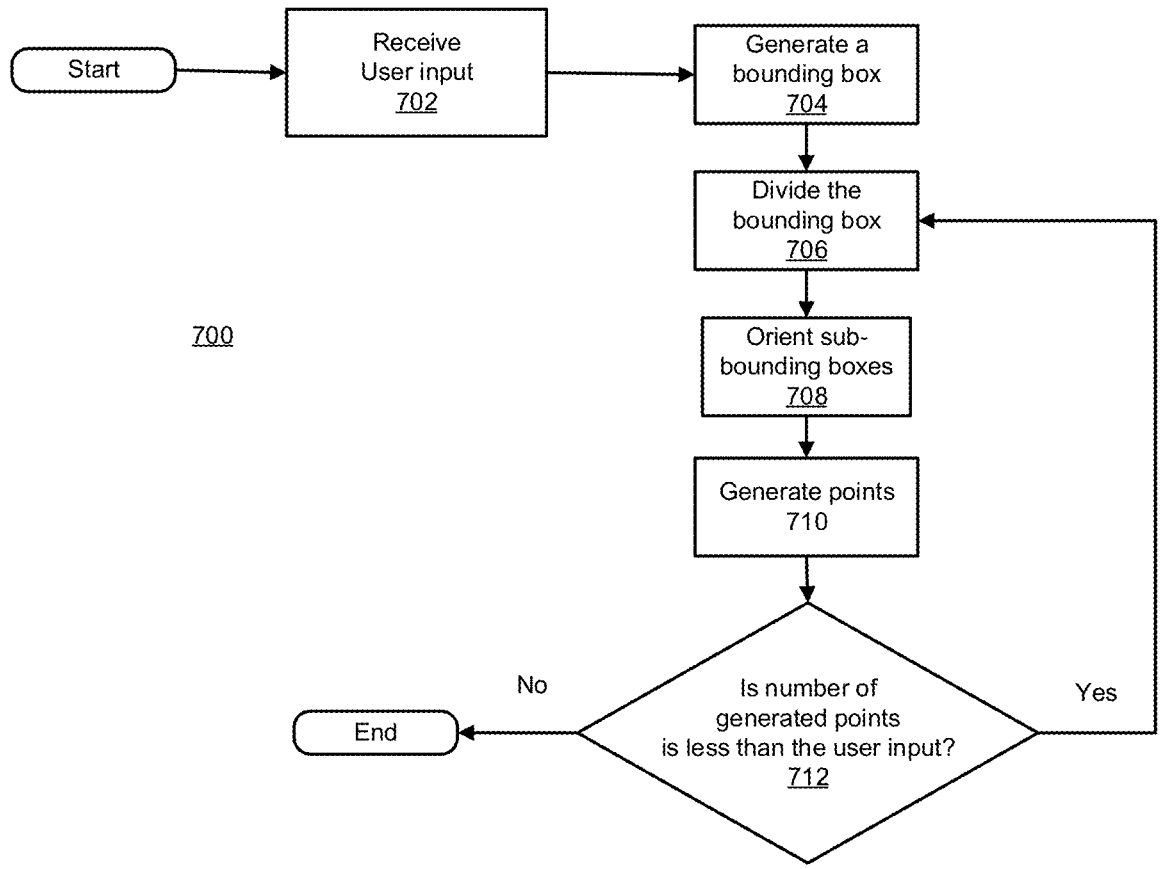
FIG. 7A shows a flowchart of an example process according to an embodiment.
Figure 7B:
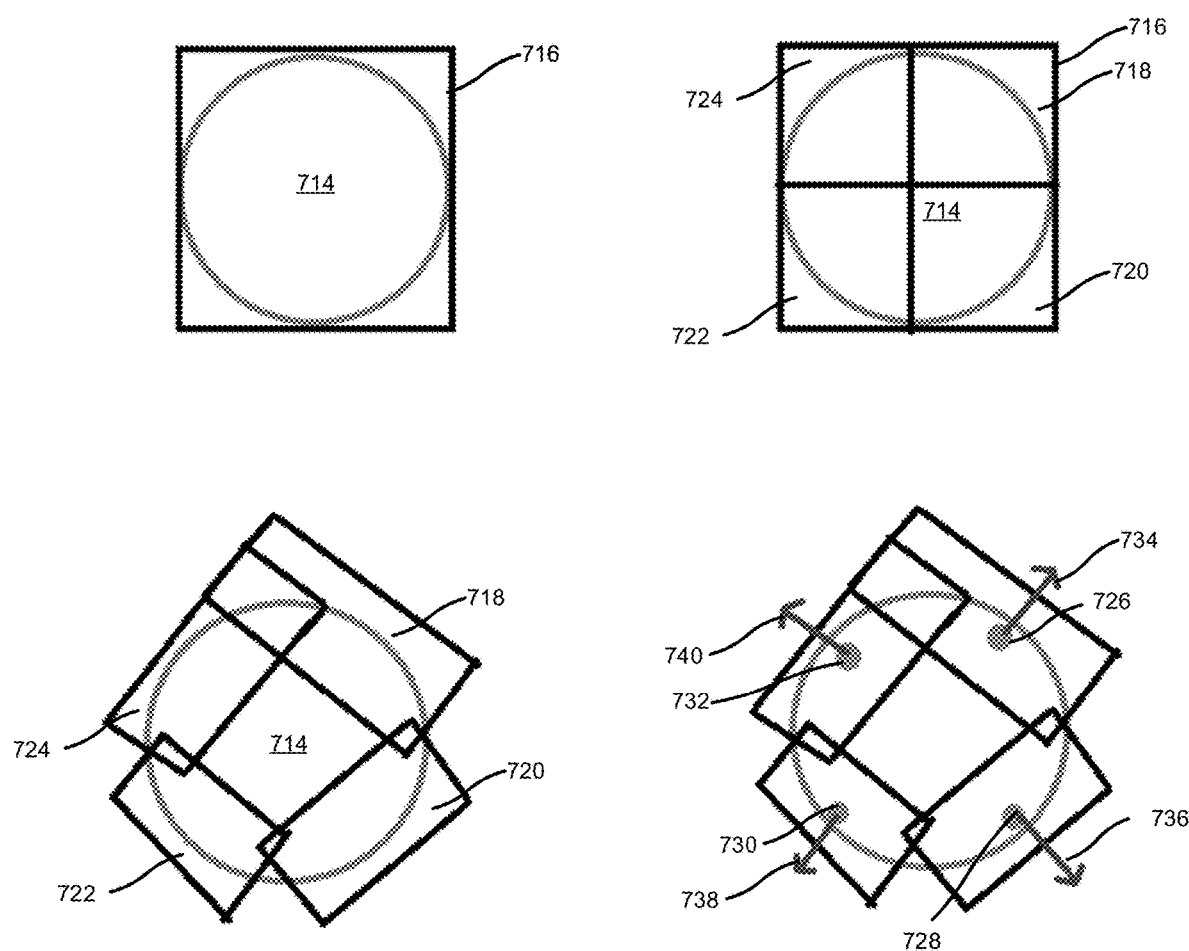
FIG. 7B illustrates an example of a bounding box method according to an embodiment.

Now referring to FIG. 7A that shows an example of an embodiment of a bounding box method 700 that can be used to generate points. In operation 702, the method can include receiving a user input to generate a control point. In operation 704 (shown in FIG. 7A), in response to receiving the user input, the method can include generating a bounding box 716 to surround a mesh of a geometry 714 that needs to be morphed as shown in FIG. 7B. In operation 706 (shown in FIG. 7A), the method can further include dividing the bounding box 716 into a plurality sub-bounding boxes 718, 720, 722, 724 as shown in FIG. 7B. In operation 708 (shown in FIG. 7A), the method can further include orienting each of the plurality of sub-bounding boxes 718, 720, 722, 724 such that a volume of each of the plurality of sub-bounding boxes 718, 720, 722, 724 is minimized and the mesh of the geometry 714 is enclosed within each of the plurality of sub-bounding boxes 718, 720, 722, 724 as shown in FIG. 7B. In some embodiments, the sub-bounding boxes 718, 720, 722, 724 can intersect with each other as shown in FIG. 7B. In operation 710 (shown in FIG. 7A), a number of points 726, 728, 730, 732 can be generated as shown in FIG. 7B. If the number of the generated points 726, 728, 730, 732 is determined to be less than the number of points assigned by the user in operation 702 (shown in FIG. 7A), the method can further include dividing each of the plurality of sub-bounding boxes 718, 720, 722, 724 in operation 706 (shown in FIG. 7A).

In some embodiments, the method can further include selecting a center of each of the plurality of sub-bounding boxes 718, 720, 722, 724 as a location of the control point 726, 728, 730, 732 as illustrated in FIG. 7B. The method can further include assigning the control point 726, 728, 730, 732 with a local coordinate system 734, 736, 738, 740, respectively.

In one embodiment, orienting each of the plurality of sub-bounding boxes 718, 720, 722, 724 in operation 708 (shown in FIG. 7A) can include resizing and rotating each of the plurality of sub-bounding boxes 718, 720, 722, 724.

Figures 4A, 4B:
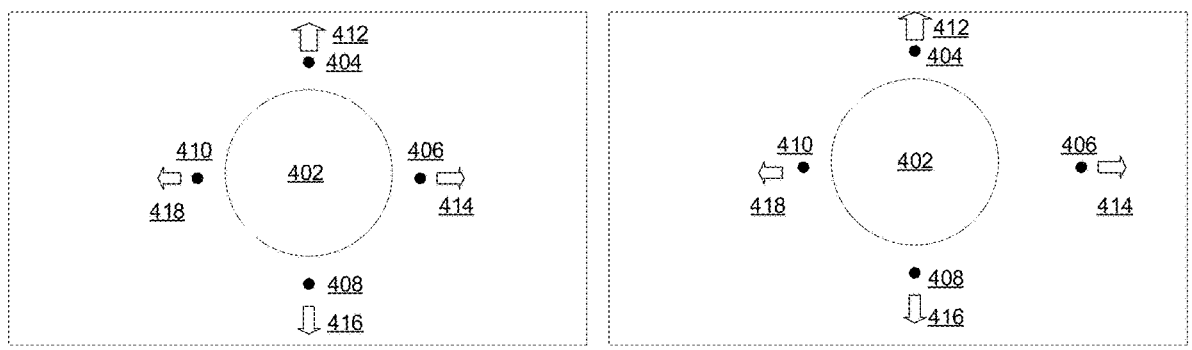
FIG. 4A shows an example of a local coordinate system being assigned at each of the reference points according to an embodiment.
FIG. 4B shows an example when a user moves one of the reference points which is now being designated as a control point along the x-direction according to an embodiment.

Referring to FIG. 4A, the morphing module in the data processing system can automatically assign each of the generated plurality of points 404, 406, 408, 410 a respective local coordinate system 412, 414, 416, 418, respectively. In various embodiments, the local coordinate system for each point can be computed automatically. In this example, the local coordinate system can be represented by the arrows. The local coordinate system can represent any local coordinate system. In this embodiment, the local coordinate system represents a two dimension (2-D) Cartesian coordinate system. For example, the arrow 414 at the generated point 406 points towards the x-direction according to the assigned local coordinate system.

In one embodiment, for example, the arrow 414 at the generated point 406 that represents the x-axis of the local coordinate system can be determined based on the bounding box during the operation generating points.

Figure 7C:
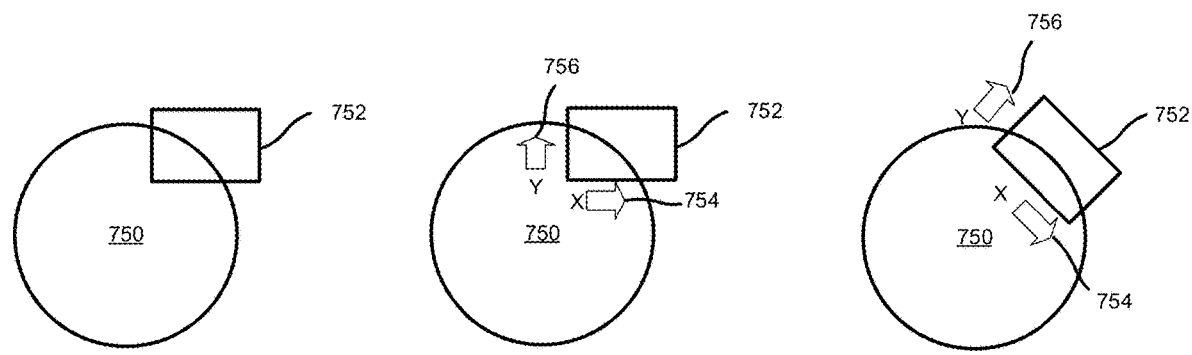
FIG. 7C shows an example of a method in determining a local coordinate system according to an embodiment.
Figure 7D:
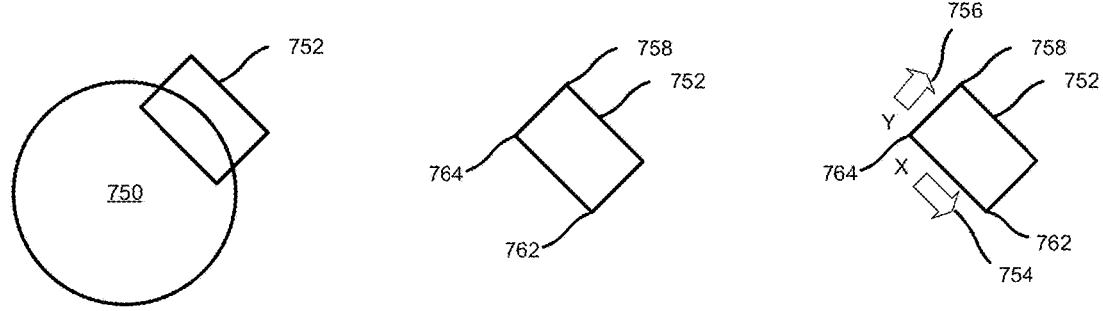
FIG. 7D shows an example of a method in determining a local coordinate system according to an embodiment.

Now referring to FIG. 7C, a bounding box 752 can be generated to surround a portion of a geometry 750 that needs to be morphed. The x-axis 754 of the local coordinate system can be determined based on the direction of the horizontal edge of the bounding box 752 which can be parallel to the Cartesian coordinate x-axis. Similarly, the y-axis 756 of the local coordinate system can be determined based on the direction of the vertical edge of the bounding box 752 which can be parallel to the Cartesian coordinate y-axis.

In one embodiment, the direction of the determined x-axis 754 and y-axis 756 of the local coordinate system can be adjusted when the bounding box 752 can be oriented to fit the least volume of the enclosed portion of the geometry 750. The adjustment of the x-axis 754 and the y-axis 756 may include a rotation according to the rotational angle applied on the bounding box 752 during the orienting.

In one embodiment, during the generating points by the morphing module in a data processing system, a bounding box 752 can be oriented to fit the least volume of the enclosed portion of the geometry 750. The morphing module in the data processing system can detect a reference coordinate of a reference corner 764 of the bounding box 752. Further, the morphing module in the data processing system can detect a first corner 758 of the bounding box 752. The morphing module in the data processing system then can detect a second corner 762 that can be diagonally opposite to the detected first corner 758. The first coordinate of the first corner 758 and the second coordinate of the second corner 762 can be determined based on the reference coordinate of the reference corner 764. As readily known to the person of the skilled in the art, any pair of corners of the bounding box 752 can be detected to determine the first and the second coordinates. In one embodiment, the x-axis 754 of the local coordinate system for the bounding box 752 can be determined based on a direction of a vector pointing from the reference corner 764 to the second corner 762. In one embodiment, the y-axis 756 of the local coordinate system for that bounding box 752 can be determined based on a direction of a vector pointing from the reference corner 764 to the first corner 758.

FIG. 4B shows an example when the morphing module in the data processing system can select one of the reference points as a control point. For example, the generated reference point 406 can be selected as a control point. The data processing system can then move the control point 406 along the x-direction according to the local coordinate system as designated by the arrow 414.

Figure 5A:
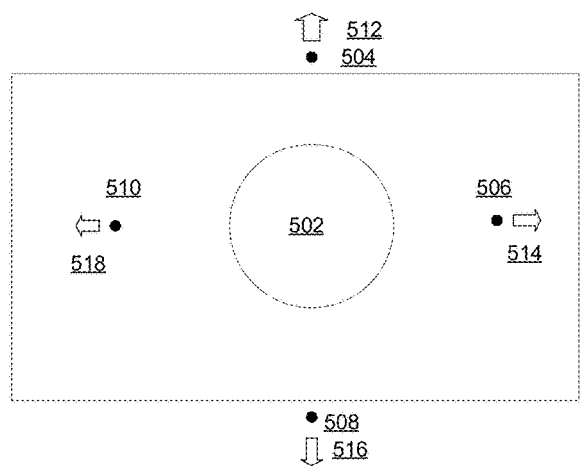
FIG. 5A shows an example of the displacement of generated points along the x-direction with respect to the local coordinate system according to an embodiment.

FIG. 5A shows that the generated control points 504, 508, 510 surrounding the circular shape 502 can be moved in x-direction according to the local coordinate system 512, 516, 518 as the control point 506 having a local coordinate system 514.

Figure 5B:
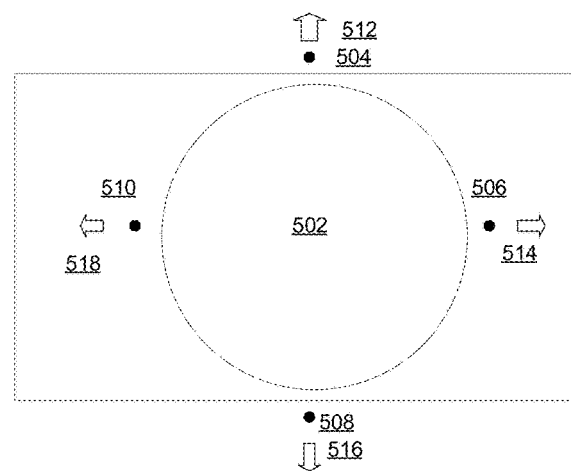
FIG. 5B shows an example of a resulting morphed shape of the geometry according to an embodiment.

FIG. 5B shows the circular shape 502 can be morphed such that the radius of the circular shape 502 changes. In this example, the radius of the circular shape 502 increases as a result of moving the control point 506 having a local coordinate system 514 in x-direction.

FIG. 6A shows an example of an asymmetric deformation being applied to the reference points 604, 606, 608, 610 having a local coordinate system 612, 614, 616, 618, respectively. A scale factor can be assigned to each of the generated plurality of reference points prior to displacing the selected control point in the respective local coordinate system. In this example, the control point 606 has been assigned with a scale factor of 1 unit. The reference point 610 has been assigned with a scale factor of 1 unit. The reference points 604, 608 have been assigned with a scale factor of 0.5.

FIG. 6B shows the morphing when the control point 606 is moved along x-direction. The morphing results in an elliptical shape 620 from an initial circular shape 602.

Figure 8:
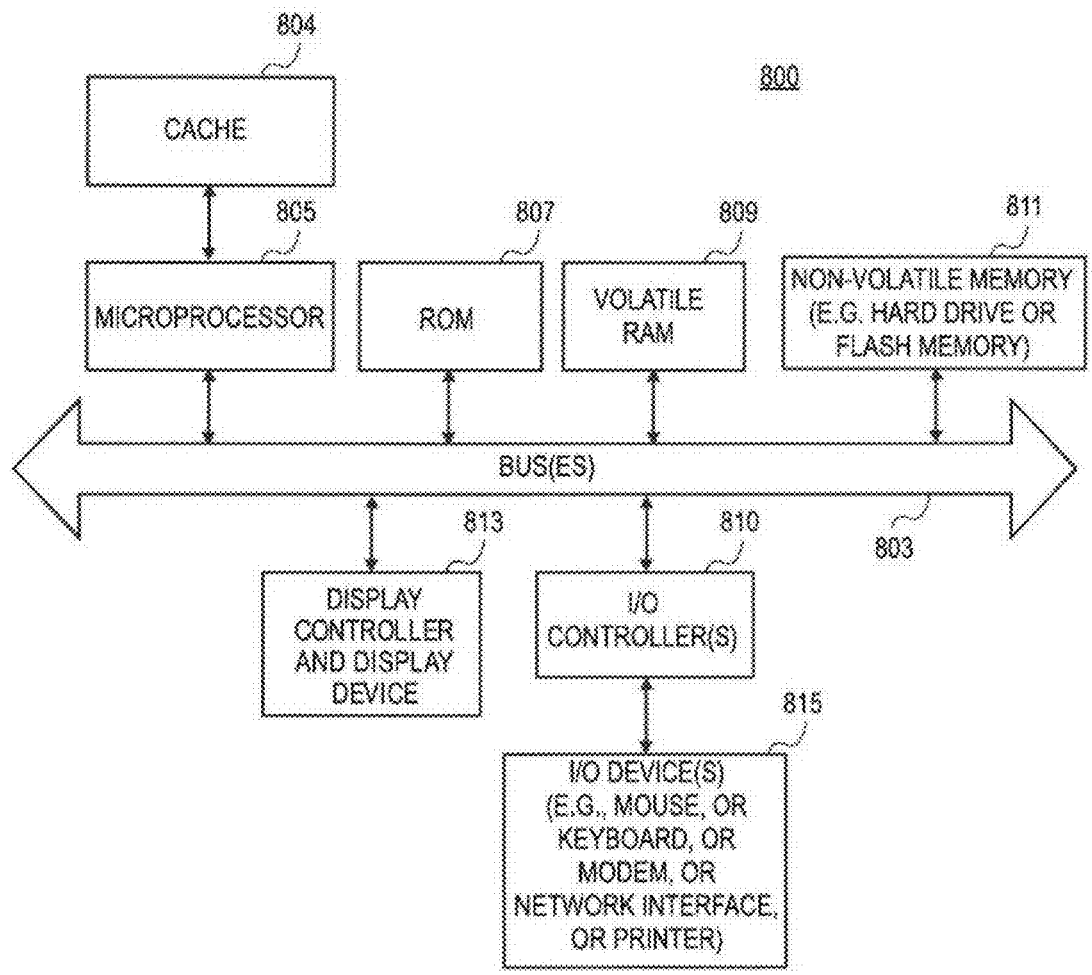
FIG. 8 is a block diagram of a data processing system which can be used to perform the one or more embodiments described herein. For example, the data processing system shown in FIG. 8 can be used to perform methods for morphing a faceted geometry.

The present disclosure is also directed to a computer-implemented system for morphing a faceted geometry. In one embodiment, for example, the system as illustrated in FIG. 8 can include a memory storing instructions; and one or more processors coupled to the memory, the one or more processors executing the instructions from the memory, the one or more processors configured to perform a method 200 as shown in FIG. 2A. The method 200 can include: operation 202 receiving a model having a predefined faceted geometry, the model can represent a physical structure that can be designed or simulated in a data processing system; operation 204 generating a plurality of points surrounding the predefined faceted geometry to be morphed; operation 206 automatically assigning each of the generated plurality of points a respective local coordinate system; operation 208 selecting a control point among the generated plurality of points for controlling a movement of the generated plurality of points; and operation 210 displacing the selected control point in the respective local coordinate system of the selected control point to cause each point to move based on movement of the selected control point according to the assigned local coordinate system, wherein the displacement of the selected control point guides a morphing of the predefined faceted geometry in the model.

In one embodiment, the method 200 as shown in FIG. 2B can further include operation 212 receiving a user input, wherein the user input can include a number of control points to be generated and wherein the generated plurality of points can include points on different surfaces or different edges. The method 200 can further include operation 214 adjusting the control point by projecting the control point on the predefined faceted geometry in the model and the associated coordinate system.

In one embodiment, the method 200 can further include operation 216 sampling the generated plurality of points by using an automated algorithm or manually picking a plurality of locations on a surface of the predefined faceted geometry in the model. The method 200 can further include operation 218 positioning the generated plurality of points away from the predefined faceted geometry in the model by positioning oriented bounding regions around the predefined faceted geometry, a centroid of each of the oriented bounding regions defining a corresponding one of the generated oriented bounding regions, and wherein an orientation of each of the oriented bounding regions defines a direction in which a respective point moves in the generated plurality of points.

Still referring to FIG. 2B, the method 200 can further include operation 220 adjusting the assigned coordinate system at each of the generated plurality of points by projecting the assigned coordinate system on the predefined faceted geometry in the model and using a normal vector at a point of projection.

In one embodiment, the generated plurality of points can be linked to one another and wherein the morphed predefined geometry can be used to generate a mesh that is used in the simulation.

In one embodiment, the selected control point can be configured to be moveable in any direction and the selected control point can be changed during a series of displacements.

In one embodiment, the method 200 can further include operation 222 assigning a scale factor to each of the generated plurality of points prior to displacing the selected control point in the respective local coordinate system.

The present disclosure is also directed to an embodiment of a non-transitory machine readable medium storing executable program instructions which when executed by a data processing system cause the data processing system to perform a method. The data processing can be a data processing system as exemplified in FIG. 8. The method 200 as exemplified in FIG. 2A can include: operation 202 receiving a model having a predefined faceted geometry, the model can represent a physical structure that can be designed or simulated in a data processing system; operation 204 generating a plurality of points surrounding the predefined faceted geometry to be morphed; operation 206 automatically assigning each of the generated plurality of points a respective local coordinate system; operation 208 selecting a control point among the generated plurality of points for controlling a movement of the generated plurality of points; and operation 210 displacing the selected control point in the respective local coordinate system of the selected control point to cause each point to move based on movement of the selected control point according to the assigned local coordinate system, wherein the displacement of the selected control point guides a morphing of the predefined faceted geometry in the model.

In one embodiment, the method 200 as shown in FIG. 2B can further include operation 212 receiving a user input, wherein the user input can include a number of control points to be generated and wherein the generated plurality of points can include points on different surfaces or different edges. The method 200 can further include operation 214 adjusting the control point by projecting the control point on the predefined faceted geometry in the model and the associated coordinate system.

In one embodiment, the method 200 can further include operation 216 sampling the generated plurality of points by using an automated algorithm or manually picking a plurality of locations on a surface of the predefined faceted geometry in the model. The method 200 can further include operation 218 positioning the generated plurality of points away from the predefined faceted geometry in the model by positioning oriented bounding regions around the predefined faceted geometry, a centroid of each of the oriented bounding regions defining a corresponding one of the generated oriented bounding regions, and wherein an orientation of each of the oriented bounding regions defines a direction in which a respective point moves in the generated plurality of points.

Still referring to FIG. 2B, the method 200 can further include operation 220 adjusting the assigned coordinate system at each of the generated plurality of points by projecting the assigned coordinate system on the predefined faceted geometry in the model and using a normal vector at a point of projection.

In one embodiment, the generated plurality of points can be linked to one another and wherein the morphed predefined geometry can be used to generate a mesh that is used in the simulation.

In one embodiment, the selected control point can be configured to be moveable in any direction and the selected control point can be changed during a series of displacements.

In one embodiment, the method 200 can further include operation 222 assigning a scale factor to each of the generated plurality of points prior to displacing the selected control point in the respective local coordinate system.

Figure 9A:
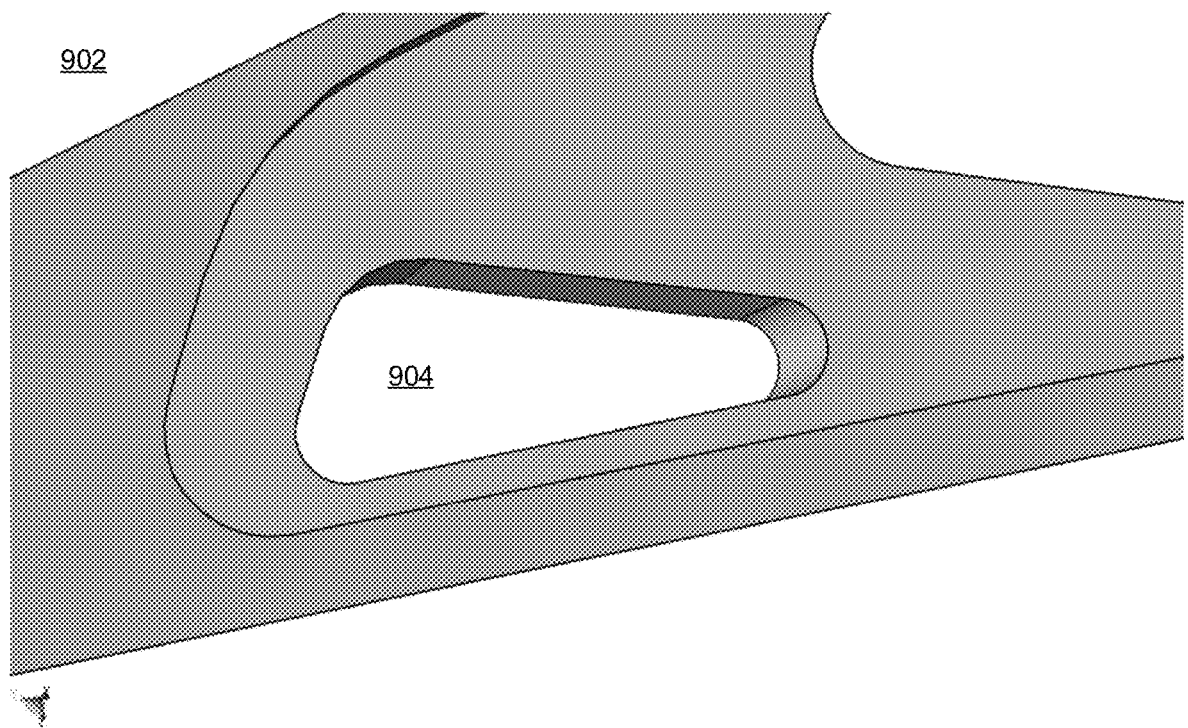
FIG. 9A shows an example of a geometry model to be morphed according to an embodiment.

FIG. 9A shows an example illustration of a geometry model 902 with an arbitrarily shaped hole 904 having a radius which needs to be expanded or shrunken through a morphing technique according to embodiment of method 200 as illustrated in FIGS. 2A and 2B.

Figure 9B:
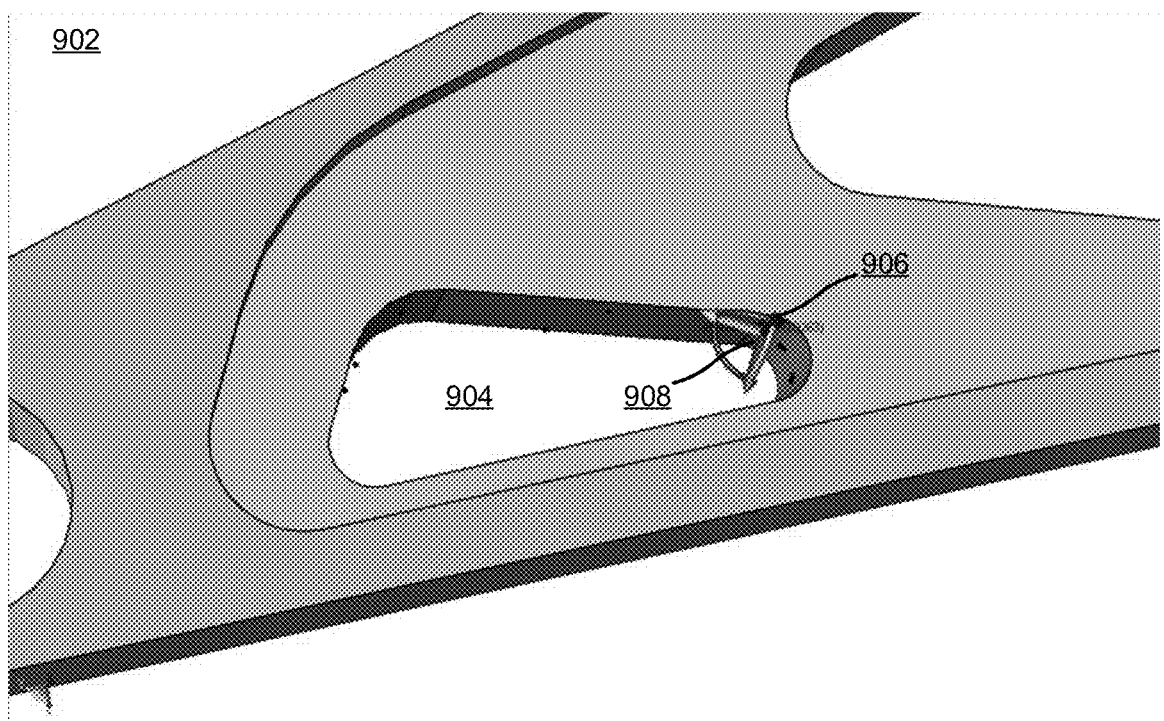
FIG. 9B shows an example of a plurality of points being generated around the geometry model that needs to be morphed according to an embodiment.

FIG. 9B shows a plurality of points that can be automatically generated on the geometry using the embodiment of method 200. FIG. 9B also shows a local coordinate system 908 that can be assigned to the generated point 906. Each point can be assigned a local coordinate system.

Figure 10A:
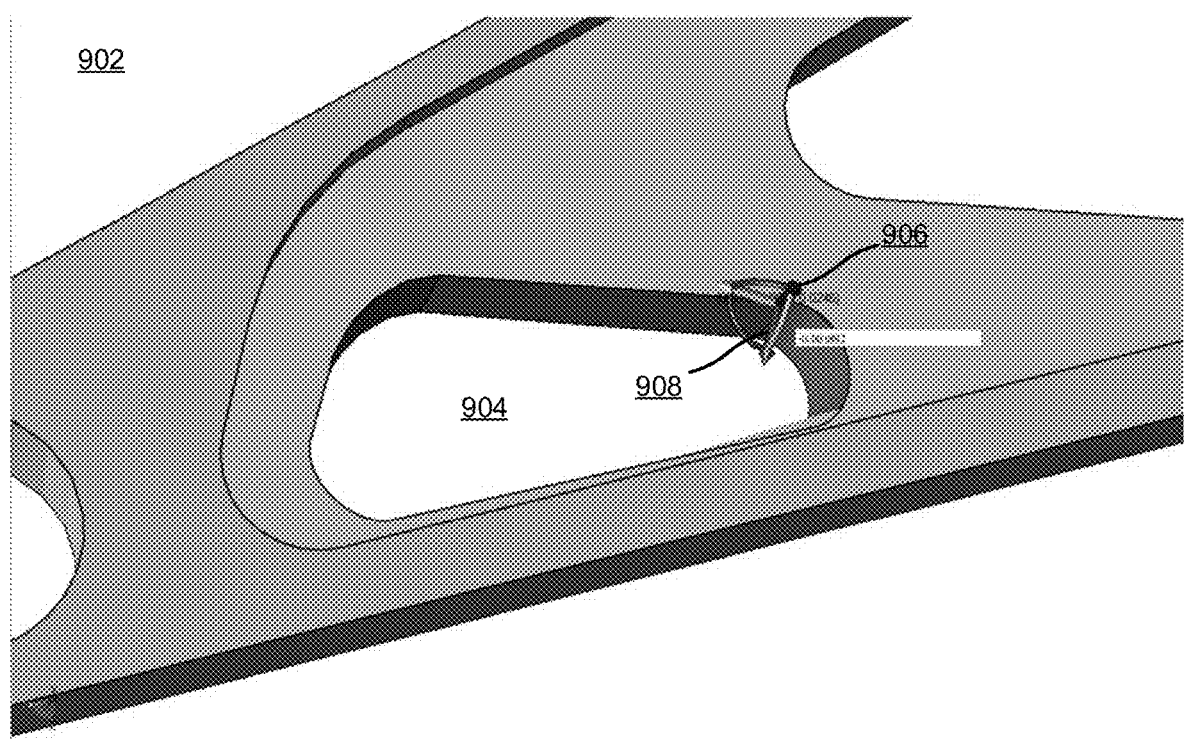
FIG. 10A shows an example of a resulting morphed shape of the geometry model according to an embodiment.

FIG. 10A shows the control point 906 can be moved in z-direction outwards according to the local coordinate system 908 which then can move all the generated points in the same direction as the control point 906 according to their local coordinate systems. The geometry model 902 with the arbitrarily shaped hole 904 having a radius can then be morphed based on the movement of the control point 906. The movement of the control point 906 according to the local coordinate system 908 can result in an increase of the radius of the arbitrarily shaped hole 904 of the geometry model 902. In one embodiment, a movement of the control point according the local coordinate system assigned to the control point may include a change of the coordinates of the control point in its assigned local coordinate system. This movement of the control point can be applied to other generated points to result in the same or similar change of coordinates for other generated points in their respectively assigned local coordinate systems.

Figure 10B:
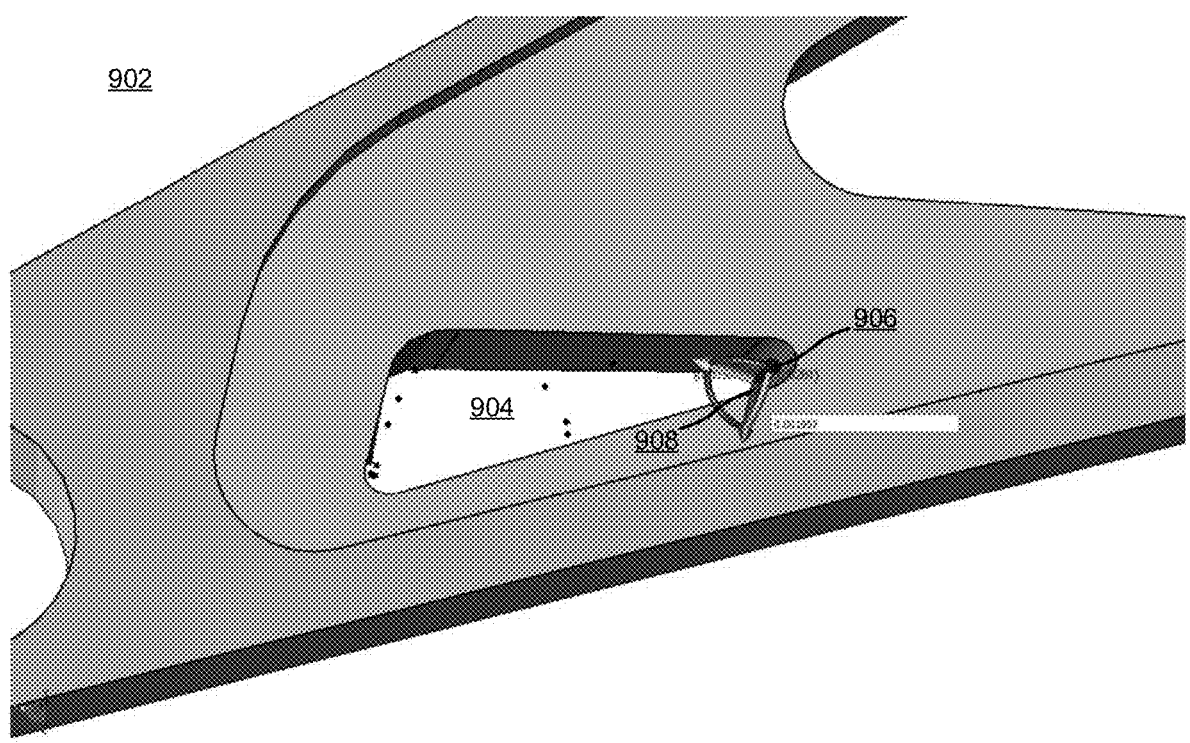
FIG. 10B shows an example of a resulting morphed shape of the geometry model according to an embodiment.

FIG. 10B shows the control point 906 can be moved in z-direction inwards according to the local coordinate system 908 which can move all the generated points in the same direction as the control point 906 according to their assigned local coordinate systems. The geometry model 902 can then be morphed based on the movement of the control point 906. The movement of the control point 906 according to the local coordinate system 908 can result in a decrease of the radius of the arbitrarily shaped hole 904 of the geometry model 902.

Figure 11:
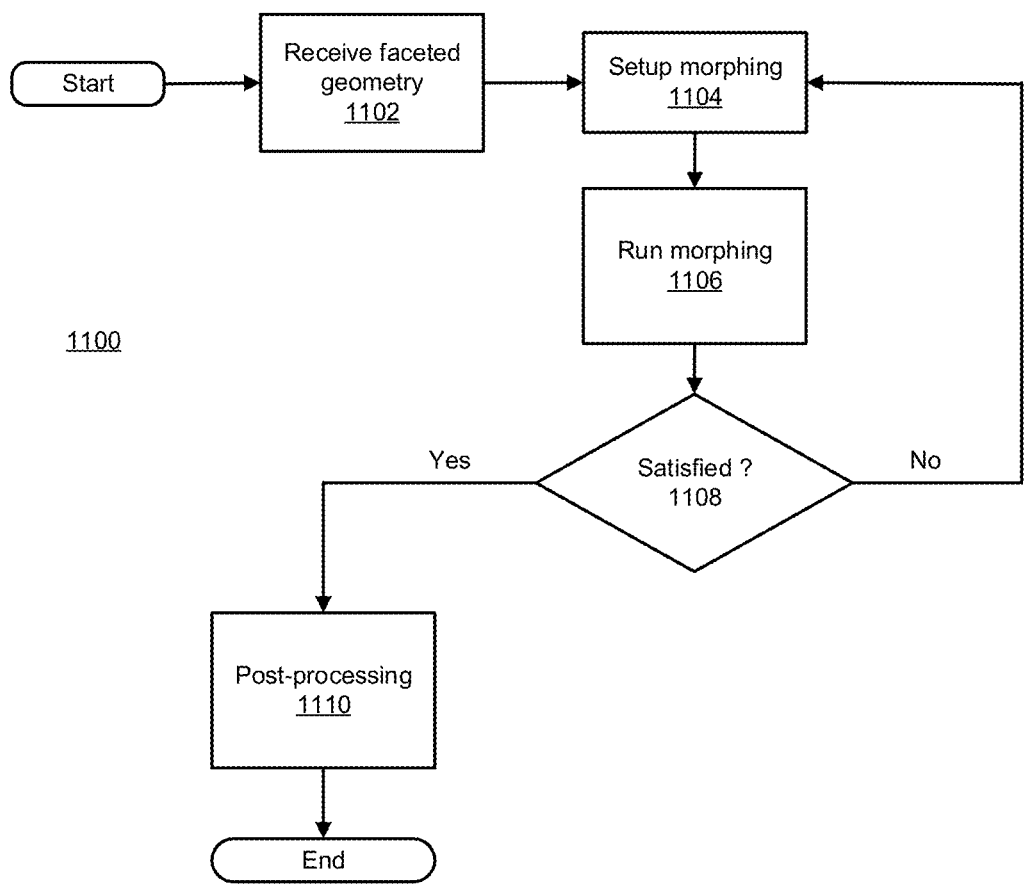
FIG. 11 shows a flowchart of an example process according to an embodiment.

As illustrated in FIG. 11, an embodiment of a process 1100 can be used with a data processing system is shown in FIG. 8. In process 1100, the data processing system can receive a model having a faceted geometry in step 1102. The embodiment of a process 1100 can include setting up the morphing in step 1104. For example, the data processing system can receive a user input as illustrated in operation 212 of method 200 in FIG. 2B. The user input can include a number of control points to be generated and the generated plurality of points can include points on different surfaces or different edges.

In one embodiment, the process 1100 can include step 1106 in which the morphing can be performed by the data processing system. A determination is performed in step 1108 if the morphed geometry satisfies the design requirement. If the morphed geometry satisfied the design requirement, the morphed geometry can be used in post-processing step in 1110. In one embodiment, the morphed geometry can be used with other tools such as FLUENT meshing, WB meshing, SpaceClaim meshing, and TurboGrid.

FIG. 8 shows one example of a data processing system 800, which may be used with one embodiment. For example, the system 800 may be implemented to provide a system that can perform methods for morphing a faceted geometry. Note that while FIG. 8 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 8, the device 800, which is a form of a data processing system, includes a bus 803 which is coupled to a microprocessor(s) 805 and a ROM (Read Only Memory) 807 and volatile RAM 809 and a non-volatile memory 811. The microprocessor(s) 805 may retrieve the instructions from the memories 807, 809, 811 and execute the instructions to perform operations described above. The microprocessor(s) 805 may contain one or more processing cores. The bus 803 interconnects these various components together and also interconnects these components 805, 807, 809, and 811 to a display controller and display device 813 and to peripheral devices such as input/output (I/O) devices 815 which may be touchscreens, mice, keyboards, modems, network interfaces, printers and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 811 will also be a random access memory although this is not required. While FIG. 8 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor IC (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a computer readable storage medium, such as, but not limited to, any type of disk including floppy disks, optical disks, CD-ROMs, and magnetic-optical disks, DRAM (volatile), flash memory, read-only memories (ROMs), RAMs, EPROMs, EEPROMs, magnetic or optical cards, or any type of media suitable for storing electronic instructions, and each coupled to a device bus.

A machine readable medium includes any mechanism for storing information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A computer-implemented method for morphing a faceted geometry, the method comprising:
   receiving a model having a predefined faceted geometry, the model representing a physical structure that is designed or simulated in a data processing system;
   generating a plurality of points surrounding the predefined faceted geometry to be morphed;
   automatically assigning each of the generated plurality of points a respective local coordinate system;
   selecting a control point among the generated plurality of points for controlling a movement of the generated plurality of points; and
   displacing the selected control point in a local coordinate system assigned to the selected control point to cause each point to move based on movement of the selected control point according to the assigned local coordinate system,
   wherein the displacement of the selected control point guides a morphing of the predefined faceted geometry in the model,
   wherein oriented bounding regions are positioned around the predefined faceted geometry, and wherein an orientation of each of the oriented bounding regions defines a direction in which a respective point in the generated plurality of points moves.

2. The method of claim 1, the method further comprising:
   receiving a user input, wherein the user input includes a number of control points to be generated and wherein the generated plurality of points include points on different surfaces or different edges.

3. The method of claim 1, the method further comprising:
   adjusting the control point by projecting the control point on the predefined faceted geometry in the model and the associated coordinate system.

4. The method of claim 1, the method further comprising:
   sampling the generated plurality of points by using an automated algorithm or manually picking a plurality of locations on a surface of the predefined faceted geometry in the model.

5. The method of claim 1, the method further comprising:
   adjusting the assigned coordinate system at each of the generated plurality of points by projecting the assigned coordinate system on the predefined faceted geometry in the model and using a normal vector at a point of projection.

6. The method of claim 1, wherein the generated plurality of points are linked to one another and wherein the morphed predefined geometry is used to generate a mesh that is used in the simulation.

7. The method of claim 1, wherein the selected control point is configured to be moveable in any direction and the selected control point can be changed during a series of displacements.

8. The method of claim 1, the method further comprising assigning a scale factor to each of the generated plurality of points prior to displacing the selected control point in the local coordinate system.

9. The method of claim 1, wherein the generating of the plurality of points surrounding the predefined faceted geometry to be morphed comprises:
   generating a bounding box to surround a mesh of the predefined faceted geometry to be morphed;
   dividing the bounding box into a plurality sub-bounding boxes;
   orienting each of the plurality of sub-bounding boxes such that a volume of each of the plurality of sub-bounding boxes is minimized and the mesh of the geometry is enclosed within each of the plurality of sub-bounding boxes.

10. The method of claim 9, wherein the automatically assigning each of the generated plurality of points a respective local coordinate system comprises:
    determining the local coordinate system associated with each of the generated points based on the generated bounding box.

11. A computer-implemented system for morphing a faceted geometry the system comprising:
    a memory storing instructions; and
    one or more processors coupled to the memory, the one or more processors executing the instructions from the memory, the one or more processors configured to perform a method including:
    receiving a model having a predefined faceted geometry, the model representing a physical structure that is designed or simulated in a data processing system;
    generating a plurality of points surrounding the predefined faceted geometry to be morphed;
    automatically assigning each of the generated plurality of points a respective local coordinate system;
    selecting a control point among the generated plurality of points for controlling a movement of the generated plurality of points; and
    displacing the selected control point in a local coordinate system assigned to the selected control point to cause each point to move based on movement of the selected control point according to the assigned local coordinate system,
    wherein the displacement of the selected control point guides a morphing of the predefined faceted geometry in the model,
    wherein oriented bounding regions are positioned around the predefined faceted geometry, and wherein an orientation of each of the oriented bounding regions defines a direction in which a respective point in the generated plurality of points moves.

12. The system of claim 11, the system further comprising:
    receiving a user input, wherein the user input includes a number of control points to be generated and wherein the generated plurality of points include points on different surfaces or different edges.

13. The system of claim 11, the system further comprising:
    adjusting the control point by projecting the control point on the predefined faceted geometry in the model and the associated coordinate system.

14. The system of claim 11, the system further comprising:
    sampling the generated plurality of points by using an automated algorithm or manually picking a plurality of locations on a surface of the predefined faceted geometry in the model.

15. The system of claim 11, the system further comprising:
    adjusting the assigned coordinate system at each of the generated plurality of points by projecting the assigned coordinate system on the predefined faceted geometry in the model and using a normal vector at a point of projection.

16. The method of claim 11, wherein the generated plurality of points are linked to one another and wherein the morphed predefined geometry is used to generate a mesh that is used in the simulation.

17. The method of claim 11, wherein the selected control point is configured to be moveable in any direction and the selected control point can be changed during a series of displacements.

18. The system of claim 11, the system further comprising:
assigning a scale factor to each of the generated plurality of points prior to displacing the selected control point in the local coordinate system.

19. A non-transitory machine readable medium storing executable program instructions which when executed by a data processing system cause the data processing system to perform a method comprising:
receiving a model having a predefined faceted geometry, the model representing a physical structure that is designed or simulated in a data processing system;
generating a plurality of points surrounding the predefined faceted geometry to be morphed;
automatically assigning each of the generated plurality of points a respective local coordinate system;
selecting a control point among the generated plurality of points for controlling a movement of the generated plurality of points; and
displacing the selected control point in a local coordinate system assigned to the selected control point to cause each point to move based on movement of the selected control point according to the assigned local coordinate system,
wherein the displacement of the selected control point guides a morphing of the predefined faceted geometry in the model,
wherein oriented bounding regions are positioned around the predefined faceted geometry, and wherein an orientation of each of the oriented bounding regions defines a direction in which a respective point in the generated plurality of points moves.

20. The medium of claim 19, the medium further comprising:
receiving a user input, wherein the user input includes a number of control points to be generated and wherein the generated plurality of points include points on different surfaces or different edges.

21. The medium of claim 19, the medium further comprising:
adjusting the control point by projecting the control point on the predefined faceted geometry in the model and the associated coordinate system.

22. The medium of claim 19, the medium further comprising:
sampling the generated plurality of points by using an automated algorithm or manually picking a plurality of locations on a surface of the predefined faceted geometry in the model.

23. The medium of claim 19, the medium further comprising:
adjusting the assigned coordinate system at each of the generated plurality of points by projecting the assigned coordinate system on the predefined faceted geometry in the model and using a normal vector at a point of projection.

24. The medium of claim 19, wherein the generated plurality of points are linked to one another and wherein the morphed predefined geometry is used to generate a mesh that is used in the simulation.

25. The medium of claim 19, wherein the selected control point is configured to be moveable in any direction and the selected control point can be changed during a series of displacements.

26. The medium of claim 19, the medium further comprising:
assigning a scale factor to each of the generated plurality of points prior to displacing the selected control point in the local coordinate system.

* * * * *